United States Patent
Thakare et al.

(10) Patent No.: US 8,504,911 B1
(45) Date of Patent: Aug. 6, 2013

(54) FACILITATING ACCESS TO DATA IN NETWORK PAGE GENERATION CODE

(75) Inventors: Prashant J. Thakare, Mercer Island, WA (US); Pravi Garg, Seattle, WA (US); Shashank Shekhar, Andhra Pradesh (IN); Jeremy Boynes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/348,088

(22) Filed: Jan. 11, 2012

(51) Int. Cl.
*G06F 17/00* (2006.01)

(52) U.S. Cl.
USPC ............... 715/234; 705/50; 705/51; 705/52; 705/53; 705/26.1; 705/26.41

(58) Field of Classification Search
USPC .................. 715/234; 705/50–53, 26.1, 26.41
See application file for complete search history.

(56) References Cited

U.S. PATENT DOCUMENTS

| | | | | |
|---|---|---|---|---|
| 7,287,035 | B2 * | 10/2007 | Madan et al. ................ | 707/769 |
| 7,499,909 | B2 * | 3/2009 | Liu et al. .............................. | 1/1 |
| 7,725,465 | B2 * | 5/2010 | Liao et al. ..................... | 707/728 |
| 7,747,610 | B2 * | 6/2010 | Chinchwadkar et al. ..... | 707/716 |
| 7,941,419 | B2 * | 5/2011 | Bhatkar et al. ................ | 707/708 |
| 8,005,816 | B2 * | 8/2011 | Krishnaprasad et al. ..... | 707/709 |
| 8,027,982 | B2 * | 9/2011 | Ture et al. ..................... | 707/741 |
| 8,281,026 | B2 * | 10/2012 | Lankford et al. ............. | 709/231 |
| 8,290,977 | B2 * | 10/2012 | Chinchwadkar et al. ..... | 707/778 |
| 8,332,430 | B2 * | 12/2012 | Koide et al. ................... | 707/783 |
| 8,352,475 | B2 * | 1/2013 | Bhatkar et al. ................ | 707/741 |
| 2007/0208744 | A1 * | 9/2007 | Krishnaprasad et al. ......... | 707/9 |
| 2007/0208755 | A1 * | 9/2007 | Bhatkar et al. .................. | 707/10 |
| 2007/0209080 | A1 * | 9/2007 | Ture et al. ........................ | 726/28 |
| 2008/0077851 | A1 * | 3/2008 | Hesmer et al. ................ | 715/234 |
| 2009/0037514 | A1 * | 2/2009 | Lankford et al. ............. | 709/201 |
| 2009/0106280 | A1 * | 4/2009 | Natchetoi et al. ............ | 707/101 |
| 2012/0150993 | A1 * | 6/2012 | Flack et al. .................... | 709/217 |
| 2012/0304275 | A1 * | 11/2012 | Ji et al. ............................ | 726/11 |

OTHER PUBLICATIONS

Saxon: the Java API; Sep. 10, 2003; Sourceforge.net; pp. 1-5.*
U.S. Appl. No. 13/363,761 entitled "Multipart Encoding in Data Aggregation for Network Page Generation," filed Feb. 1, 2012.
U.S. Appl. No. 13/363,770 entitled "Loading Customer-Supplied Network Page Generation Code," filed Feb. 1, 2012.
U.S. Appl. No. 13/363,782 entitled "Error Handling in a Network Page Generation Environment," filed Feb. 1, 2012
U.S. Appl. No. 13/363,787 entitled "Data Contracts for Network Page Generation Code," filed Feb. 1, 2012.

(Continued)

*Primary Examiner* — Doug Hutton, Jr.
*Assistant Examiner* — Andrew Dyer
(74) *Attorney, Agent, or Firm* — Thomas|Horstemeyer, LLP

(57) ABSTRACT

Disclosed are various embodiments for facilitating access to data in network page generation code supplied by customers of a hosting provider. A request for a network page is obtained from a client. The network page is associated with a network site hosted by a hosting provider on behalf of a customer. Page generation code supplied by the customer is obtained, and this code includes a dynamic data variable. One or more service calls are executed based at least in part on the dynamic data variable to obtain one or more data objects. The page generation code is executed to generate the network page in response to the request, where the page generation code is executed with the data objects in place of the dynamic data variable.

24 Claims, 4 Drawing Sheets

OTHER PUBLICATIONS

U.S. Appl. No. 13/363,816 entitled "Network Site Hosting in a Managed Environment," filed Feb. 1, 2012.

U.S. Appl. No. 13/348,051 entitled "Generating Network Pages Using Customer-Supplied Generation Code," filed Jan. 11, 2012.

U.S. Appl. No. 13/348,069 entitled "Securing Execution of Customer-Supplied Network Page Generation Code," filed Jan. 11, 2012.

U.S. Appl. No. 13/348,081 entitled "Virtual File System for Hosted Network Sites," filed Jan. 11, 2012.

U.S. Appl. No. 13/348,059 entitled "Generating Network Pages Using Customer-Generated Network Page Portions," filed Jan. 11, 2012.

U.S. Appl. No. 13/347,953 entitled "Opportunistic Unloading of Network Applications," filed Jan. 11, 2012.

* cited by examiner

FACILITATING ACCESS TO DATA IN NETWORK PAGE GENERATION CODE

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compliance with the security standards. However, merchants may lose flexibility in customizing or configuring their network sites when using such a hosted solution as compared with a self-managed solution.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating access to data in network page generation code, where the network page generation code may be executed within a controlled environment that prevents direct access to the data by way of service calls or other arbitrary code. Merchants and other owners of network page sites may contract with hosting providers to generate and serve up their network sites. For example, a hosting provider may offer an end-to-end hosted electronic commerce platform that maintains an item catalog, generates detail pages for items, facilitates searching for items, facilitates browsing for items by way of a taxonomy or by way of suggested items, allows for customer reviews of items, and so on. Such a hosted electronic commerce platform may include functionality relating to shopping carts, order placement, order management and fulfillment, and/or other functionality. Such a platform offers merchants many advantages over self-managed solutions.

Merchants may wish to retain stylistic and content control over their online presence, even if it leverages an end-to-end hosted electronic platform. However, the hosting provider may be reluctant to grant the merchant access to execute arbitrary page generation code due to security concerns and compliance requirements for Payment Card Industry Data Security Standards (PCI DSS) and/or other security standards. Various embodiments of the present disclosure facilitate customer control over network page generation with a hosted network site. As used herein, the term "customer" may also include developers acting on behalf of customers of the hosting provider.

In various embodiments, a merchant or other customer of the hosting provider is able to upload page generation code for execution server-side. The page generation code may include dynamic data variables which are translated into potentially multiple service calls to data sources. In various embodiments, data sources may return a document which may be automatically translated into one or more data objects for ease of use within the page generation code. Additionally, a developer may define various configurable functions separately from the page generation code for use in the page generation code in accessing a data source using one or more parameter values. In the following discussion, a general description of the system and its components is provided, followed by a discussion of the operation of the same.

Figure 1:
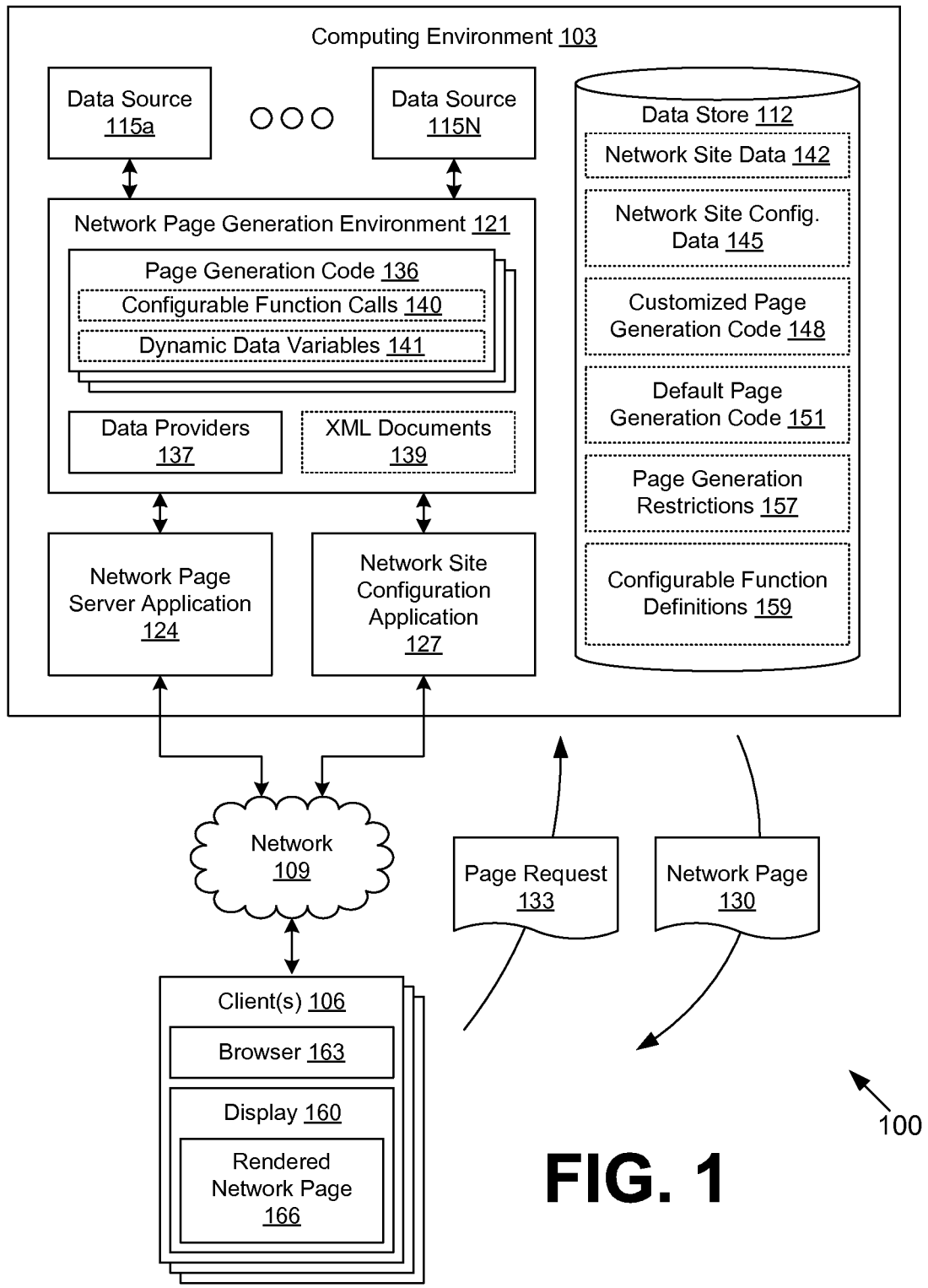
FIG. 1 is a drawing of a networked environment according to various embodiments of the present disclosure.

With reference to FIG. 1, shown is a networked environment 100 according to various embodiments relating to customer-supplied page generation code. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed by the computing environment 103, for example, include a plurality of data sources 115a . . . 115N, a network page generation environment 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on.

In various embodiments, the data sources 115 may comprise web services. For example, the data sources 115 may provide data by way of representational state transfer (REST), simple object access protocol (SOAP), web services description language (WSDL), web application description language (WADL), and/or other formats. In another embodiment, the data sources 115 may comprise files or other forms of data stores. In some cases, one or more of the data sources 115 may correspond to external data sources 115, accessible by way of the network 109, which are not managed or controlled by the hosting provider. The data sources 115 may be executed in different computing devices which may be managed by different entities.

The network page generation environment 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation environment 121 may include, or be in communication with, an electronic commerce system that performs various backend functions in order to facilitate the online purchase of items.

In some embodiments, the network page generation environment 121 may aggregate data from the data sources 115 for use in generation of network pages 130. To this end, the network page generation environment 121 may employ parallel fetching to reduce latency when data is aggregated from multiple data sources 115.

The network page generation environment 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation environment 121. The page generation code 136 may also include, for example, Expression Language (EL) expressions, XPath or XQuery expressions, and so on.

To this end, the network page generation environment 121 may include a Java Virtual Machine (JVM) and a servlet container such as Apache® Tomcat® or another servlet container. In one embodiment, the page generation code 136 may be instrumented in order to facilitate monitoring one or more resources consumed by the page generation code 136. Such resources may correspond to execution time, processor time, memory allocation, data written to an output stream, and so on.

The network page generation environment 121 may be configured to provide aggregated data from the data sources 115 to the page generation code 136, for example, as a set of predefined implicit variables or by another approach. The network page generation environment 121 may act as a "sandbox" for the page generation code 136 to enforce restrictions on application programming interface (API) calls, service calls, access to the data source 115, and/or other resources in the computing environment 103. As a non-limiting example, where the network page generation environment 121 includes a JVM, a security manager may be installed in the JVM to deny access by the page generation code 136 to system data, data of other customers, and so on.

The network page generation environment 121 may include one or more data providers 137 which facilitate access to the respective data sources 115 by the page generation code 136. In some cases, the data sources 115 may return data formatted as an extensible markup language (XML) document 139, JavaScript Object Notation (JSON), Yet Another Markup Language (YAML), or in another format. The data providers 137 and/or other logic in the network page generation environment 121 may be configured to transform the XML document 139 (or other data) automatically into one or more data objects (e.g., Java objects, etc.) which are usable by the page generation code 136.

In some cases, the page generation code 136 may include one or more configurable function calls 140. It may be desirable to restrict the page generation code 136 from including arbitrary code such as function definitions and service calls. However, to provide flexibility to the developer, configurable function calls 140 may be employed. With a configurable function call 140, a developer defines a configurable function having a function name, a set of function parameters, and configuration to various predefined acceptable functionality. In some cases, the definition of the set of function parameters may include a corresponding data type for each parameter. In one embodiment, the configurable function calls 140 are implemented in the network page generation environment 121 using Java reflection and one or more proxy functions.

As a non-limiting example, the predefined acceptable functionality may include making a request to a uniform resource locator (URL), where the URL potentially includes one or more of the function parameters. To this end, the developer may define a URL template which indicates where the various parameters should go in the URL. A non-limiting example of such a URL template may be "http://www.site.com/webservice.cgi?p1={param 1}&p2={param2}," where "param1" and "param2" correspond to two parameters of the configurable function and "{ }" indicates the presence of a parameter.

When the configurable function call 140 is used in the page generation code 136, the network page generation environment 121 may replace the configurable function call 140 with one or more service calls implementing the URL request with the specified parameter values of the configurable function call 140. In one embodiment, the customer may specify a data type for each of the parameters (e.g., integer, Boolean, object type, etc.) of the configurable function, and the network page generation environment 121 may be configured to perform type checking. This type checking may be performed even if, for example, EL does not provide type checking.

The page generation code 136 may also include one or more dynamic data variables 141. The dynamic data variables 141 may appear to be ordinary JSP or EL variables, but they may be interpreted by the network page generation environment 121 so as to replace the dynamic data variables 141 with function calls, service calls, and/or other functionality before the page generation code 136 is compiled or executed. As a non-limiting example, a dynamic data variable 141 may be "${customer.emailAddress}," where "${ }" signals the presence of an expression in EL, "customer" corresponds to a dynamically obtained Java object, and "emailAddress" corresponds to a data field in the Java object. In some cases, the dynamic data variables 141 may include configurable function calls 140.

The network page server application 124 is configured to obtain the page requests 133 from the client 106 over the network 109, to generate network pages 130 in response to the page requests 133 using the network page generation environment 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers. The network site configuration application 127 may include various components and/or may invoke various components of the network page generation environment 121 to enforce compile-time restrictions on the page generation code 136, to process dynamic data variables 141, to process configurable function calls 140, and so on.

The data stored in the data store 112 includes, for example, network site data 142, network site configuration data 145, customized page generation code 148, default page generation code 151, page generation restrictions 157, configurable function definitions 159, and potentially other data. The network site data 142 corresponds to data used in the generation of the network pages 130 for the hosted network sites of the merchants or other customers. Such data may include, for example, templates, hypertext markup language (HTML), text, XML, cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The page generation restrictions 157 may configure various restrictions to be placed on the page generation code 136 by the network page generation environment 121. As a non-limiting example, where the page generation code 136 corresponds to JSP code, the network page generation environment 121 may restrict the JSP code from including scriptlets and/or various API calls. Various functionalities may be whitelisted or blacklisted, as the case may be. Such restrictions may be configured by way of parameters in the page generation restrictions 157.

The configurable function definitions 159 may correspond, for example, to metadata files that define a configurable function for use by a customer. To this end, a configurable function definition 159 may define a function name, a set of function parameters, and configure various predefined functionality. The predefined functionality may include an HTTP "GET" request using a URL. The configurable function definition 159 may specify a URL template indicating where the parameters are to be used in the URL. In some cases, EL expressions or other code may be used in the configurable function definition 159 to generate the URL from the parameters. Such EL expressions may be subject to various restrictions similar to those of the page generation restrictions 157. In one embodiment, a configurable function definition 159 is specified in a file or data location that is separate from the customized page generation code 148. In some embodiments, the metadata files that define configurable functions may not include any Java, JSP, EL, XPath, and/or other code.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103 and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. The customer may create configurable function definitions 159 according to various predefined functionality supported by the network page generation environment 121. Through this system, customers are able to control generation of network pages 130 for their network sites, despite using a hosted infrastructure and potentially a hosted electronic commerce platform.

When a customer uploads or edits page generation code 136, the network site configuration application 127 and/or the network page generation environment 121 may perform various verifications on the static code. Such verifications may be referred to as compile-time checks, but need not occur at the same time the page generation code 136 is compiled, and in some cases, the page generation code 136 may be interpreted rather than compiled. Such verifications may be performed as configured by the page generation restrictions 157.

Furthermore, configurable function calls 140 and dynamic data variables 141 in the page generation code 136 may be processed at compile time. The configurable function calls 140 and dynamic data variables 141 may be replaced in the page generation code 136 with service calls and/or other code to facilitate data access and transformation. It is noted that the customer may be restricted from including such service calls and/or other code directly in the page generation code 136. Also, configurable function calls 140 and dynamic data variables 141 may be nested. In other words, a configurable function call 140 may depend on multiple configurable function calls 140, and dynamic data variables 141 may depend on multiple dynamic data variables 141. In one embodiment, the page generation code 136 may be restricted from making beyond a predetermined number of service calls by way of using the dynamic data variables 141 and/or the configurable function calls 140. In some cases, a dynamic data variable 141 may correspond to a data object returned from a configurable function call 140.

The page generation code 136 may be able to access a predefined set of aggregated data. In some cases, the page generation code 136 may declare various data that it accesses, which is then aggregated by the network page generation environment 121. In other cases, a standard set of data from the data sources 115 may be provided. The set of data may depend on the type of network page 130, e.g., whether the network page 130 is a checkout page, catalog page, order confirmation page, and so on. In one example, the aggregated data may be associated with the hosted electronic commerce platform provided by the hosting provider.

The aggregated data may be provided to the page generation code 136 by way of implicit variables or other variables that are available in the scope of the page generation code 136. The page generation code 136 may be configured to use all of the predefined variables or a subset of the predefined variables. The page generation code 136 may be restricted from accessing the data sources 115 directly. For example, a JVM in the network page generation environment 121 may be configured to deny access by the page generation code 136 to data other than certain implicit variables.

In operation, the client 106 sends a page request 133 to the network page server application 124 for some network page 130 from a network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation environment 121, which then may obtain the aggregated data.

Additionally, the code corresponding to the dynamic data variables 141 and the configurable function calls 140 may be executed. In various cases, XML documents 139 or other data are obtained from the data sources 115. The data providers 137 may be configured to automatically transform XML documents 139 or other data into a format easily suited for use by the EL expressions or other code in the page generation code 136. For example, XPath or XQuery may be used to access the data in the XML document 139, and one or more Java objects may be generated from the data. The Java objects may be accessed by the page generation code 136 supplied by the customer relative to the dynamic data variable 141.

Requests to obtain data from the data sources 115 may result in various errors, e.g., HTTP error 400, HTTP error 500, and so on. Such errors may be propagated back to the page generation code 136. Consequently, the page generation code 136 may include error-handling code to deal with a situation in which a dynamic data variable 141 is set to an error code, and/or a situation in which a configurable function call 140 produces an error code.

The page generation code 136 for the requested network page 130 is executed by the network page generation environment 121. The network page generation environment 121 facilitates access to the aggregated data by the page generation code 136. The page generation code 136 generates the network page 130, and the network page server application 124 serves up the network page 130 to the client 106 in response to the page request 133.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible, for example, only as dynamic data variables 141 or through configurable function calls 140.

Resource consumption limits may be enforced upon the configurable function calls 140 and the dynamic data variables 141. As an example, a maximum size limit may be enforced for XML documents 139 obtained from data sources 115. As another example, a maximum time limit may be set for execution of the code that obtains the data for the dynamic data variables 141 and/or the configurable function calls 140. Thus, the network page generation environment 121 may not wait indefinitely for data from a data source 115. When a timeout or other limit is enforced upon a configurable function call 140 or a dynamic data variable 141, an error may be produced, which may be handled in the page generation code 136.

Figure 2:
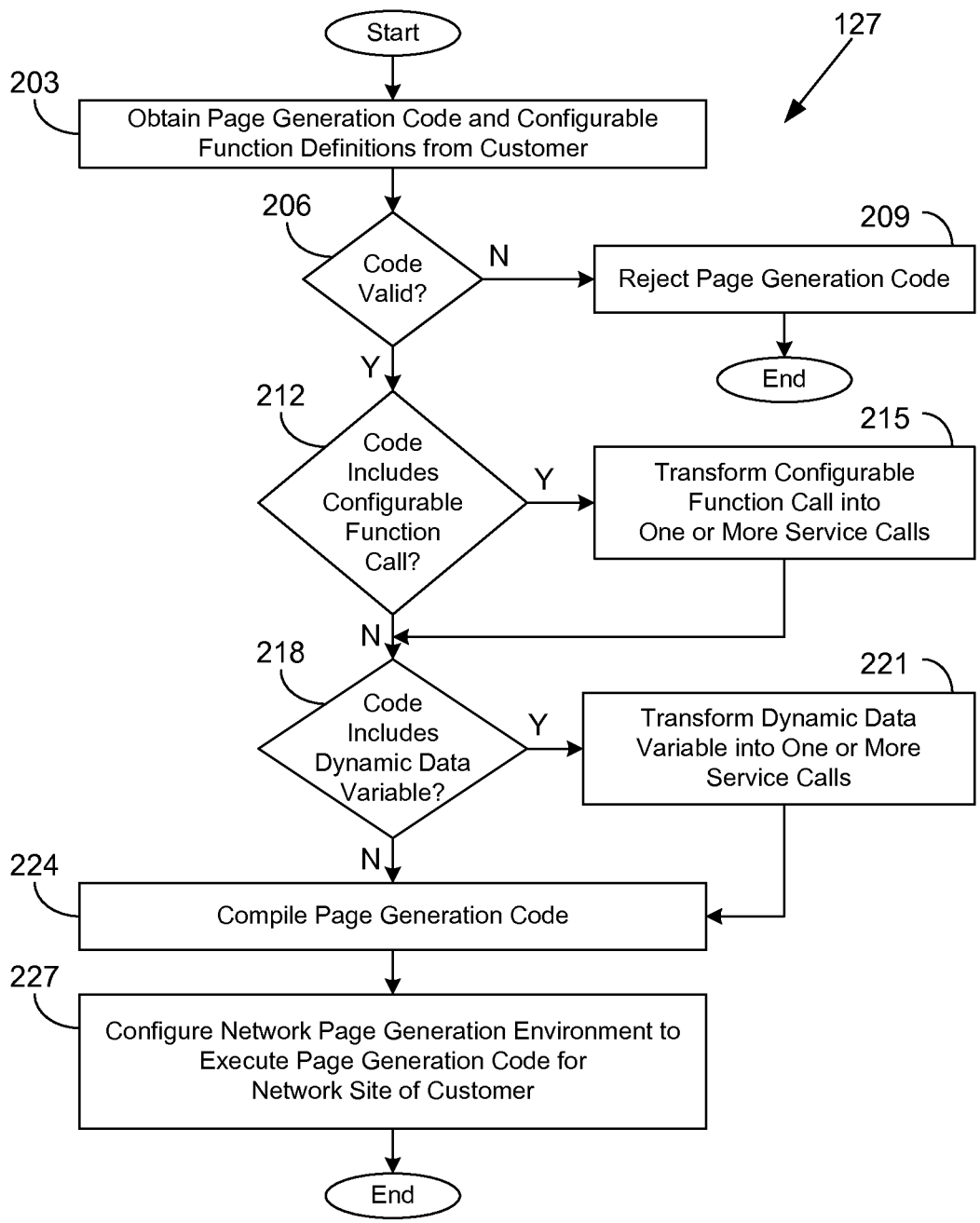
FIG. 2 is a flowchart illustrating one example of functionality implemented as portions of a network site configuration application executed in a computing environment in the networked environment of FIG. 1 according to various embodiments of the present disclosure.

Referring next to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) and potentially one or more configurable function definitions 159 (FIG. 1) from a customer whose network site is hosted by the hosting provider who operates the computing environment 103. The network site configuration application 127 may be configured to authenticate a client 106 (FIG. 1) associated with the customer. In box 206, the network site configuration application 127 determines whether the page generation code 136 and the configurable function definitions 159 are is valid. In various examples, validity may depend on compliance with security policies and other restrictions that may be evaluated at or before compile time. If the page generation code 136 or the configurable function definitions 159 are not valid, the network site configuration application 127 rejects the page generation code 136 and/or the configurable function definitions 159 in box 209. An error may be presented to the customer. Thereafter, the portion of the network site configuration application 127 ends.

If the page generation code 136 is valid, the network site configuration application 127 proceeds from box 206 to box 212. In box 212, the network site configuration application 127 determines whether the page generation code 136 includes one or more configurable function calls 140 (FIG. 1). If so, the network site configuration application 127 transforms the configurable function calls 140 to one or more service calls and/or other code in box 215. The network site configuration application 127 proceeds to box 218. If the page generation code 136 does not include one or more configurable function calls 140, the network site configuration application 127 proceeds from box 212 to box 218.

In box 218, the network site configuration application 127 determines whether the page generation code 136 includes one or more dynamic data variables 141 (FIG. 1). If so, the network site configuration application 127 continues to box 221 and transforms the dynamic data variables 141 into one or more service calls and/or other code. The network site configuration application 127 proceeds to box 224. If the page generation code 136 does not include one or more dynamic data variables 141, the network site configuration application 127 continues from box 218 to box 224.

In box 224, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103. In some embodiments, the page generation code 136 may be interpreted rather than compiled. In box 227, the network site configuration application 127 configures the network page generation environment 121 to execute the compiled page generation code 136 for one or more network pages 130 (FIG. 1) for the network site of the customer. Thereafter, the portion of the network site configuration application 127 ends.

Figure 3:
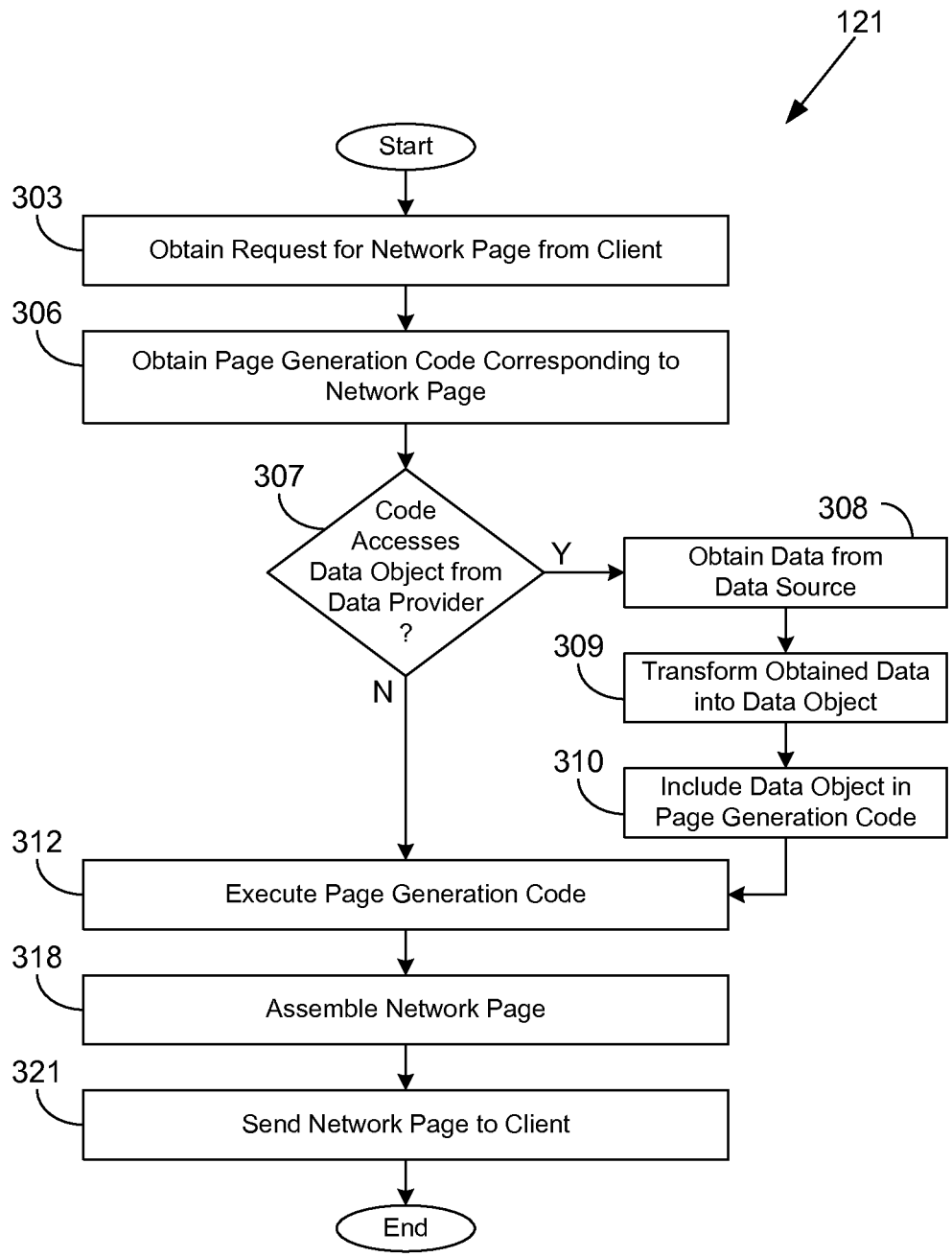
FIG. 3 is a flowchart illustrating one example of functionality implemented as portions of a network page generation environment executed in a computing environment in the networked environment of FIG. 1 according to various embodiments of the present disclosure.

Continuing on to FIG. 3, shown is a flowchart that provides one example of the operation of a portion of the network page generation environment 121 according to the embodiments discussed in connection with FIG. 1. It is understood that the flowchart of FIG. 3 provides merely an example of the many different types of functional arrangements that may be employed to implement the operation of the portion of the network page generation environment 121 as described herein. As an alternative, the flowchart of FIG. 3 may be viewed as depicting an example of steps of a method implemented in the computing environment 103 (FIG. 1) according to one or more embodiments.

Beginning with box 303, the network page generation environment 121 obtains a page request 133 (FIG. 1) from the client 106 (FIG. 1) by way of a network page server application 124 (FIG. 1). The page request 133 indicates a network page 130 (FIG. 1) from a network site of a customer. The network site is hosted by the hosting provider who operates the computing environment 103. In box 306, the network page generation environment 121 obtains or fetches page generation code 136 (FIG. 1) corresponding to the requested network page 130.

In box 307, the network page generation environment 121 determines whether the page generation code 136 accesses one or more data objects provided by one or more data providers 137 (FIG. 1). The access may correspond to one or more dynamic data variables 141. If the page generation code 136 does access such data objects, in box 308, the data provider 137 in the network page generation environment 121 obtains data from a data source 115 (FIG. 1). In one example, such data corresponds to an XML document 139 (FIG. 1). In box 309, the data provider 137 in the network page generation environment 121 transforms the obtained data into one or more data objects. Where the data is an XML document 139, the data provider 137 may employ XPath code to transform the XML document 139 into one or more Java objects. In box 310, the network page generation environment 121 includes the data objects in the scope of the page generation code 136.

In box 312, the network page generation environment 121 executes the page generation code 136. In doing so, the network page generation environment 121 may perform various runtime checks to ensure that the page generation code 136 does not include any impermissible code or content. In box 318, the network page generation environment 121 assembles the network page 130 using the output of the page generation code 136 and potentially other data. In box 321, the network page generation environment 121 sends the generated network page 130 to the client 106 in response to the page request 133. Thereafter, the portion of the network page generation environment 121 ends.

Figure 4:
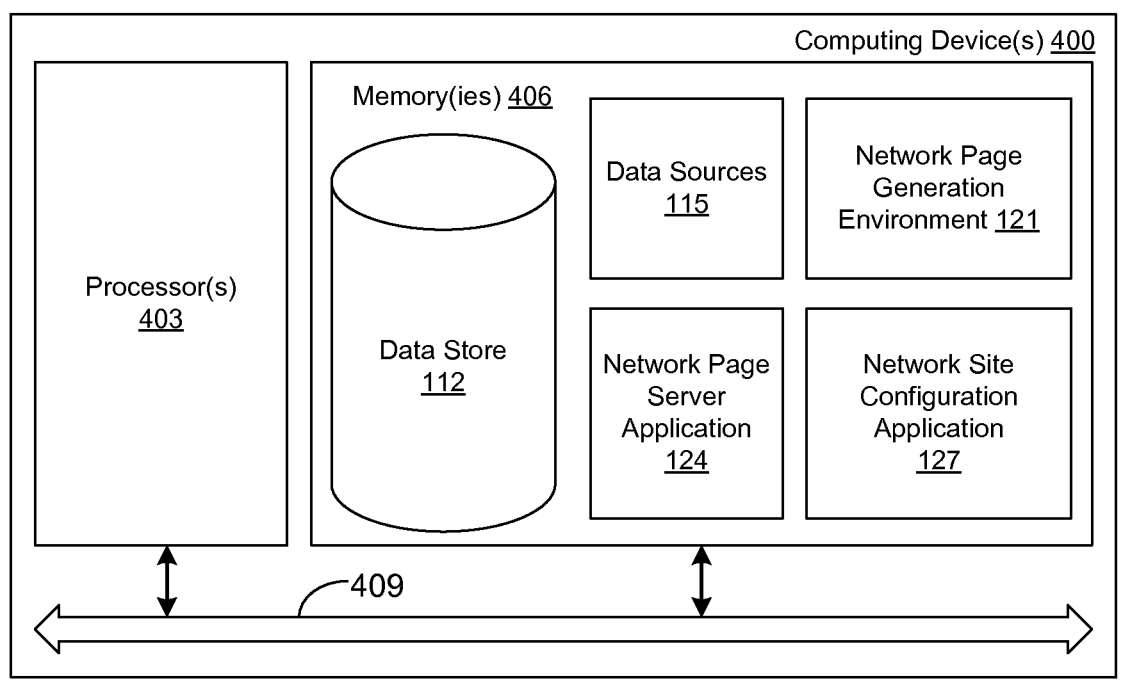
FIG. 4 is a schematic block diagram that provides one example illustration of a computing device employed in the computing environment in the networked environment of FIG. 1 according to various embodiments of the present disclosure.

With reference to FIG. 4, shown is a schematic block diagram of the computing device 400 according to an embodiment of the present disclosure. The computing device 400 corresponds to a representative computing device which may be employed in the computing environment 103 (FIG. 1). The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data sources 115, the network page generation environment 121, the network page server application 124, the network site configuration application 127, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data sources 115, the network page generation environment 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-3 show the functionality and operation of an implementation of portions of the network site configuration application 127 and the network page generation environment 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2-3 show a specific order of execution, it is understood that the order of execution may differ from that which is depicted. For example, the order of execution of two or more blocks may be scrambled relative to the order shown. Also, two or more blocks shown in succession in FIGS. 2-3 may be executed concurrently or with partial concurrence. Further, in some embodiments, one or more of the blocks shown in FIGS. 2-3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data sources 115, the network page generation environment 121, the network page server application 124, and the network site configuration application 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

obtaining, in at least one computing device, metadata supplied by a customer, the metadata specifying a configurable function that produces an executable object;

obtaining, in the at least one computing device, page generation code supplied by the customer, the page generation code corresponding to JavaServer Pages (JSP) code, the page generation code including a call to the configurable function, the call to the configurable function specifying at least one parameter value;

executing, in the at least one computing device, at least one service call based at least in part on the call to the configurable function to obtain an extensible markup language (XML) document;

automatically instantiating, in the at least one computing device, an executable object from the XML document using XPath code; and executing, in the at least one computing device, the page generation code to generate a network page, wherein the executable object is accessible by the page generation code, wherein the execution of the page generation code is configured to restrict the page generation code from directly executing the at least one service call.

2. The method of claim 1, wherein the call to the configurable function corresponds to an Expression Language (EL) expression.

3. The method of claim 1, further comprising:

obtaining, in the at least one computing device, a request for the network page from a client, the network page being associated with a network site hosted by a hosting provider on behalf of the customer;

sending, in the at least one computing device, the network page to the client; and wherein the execution of the at least one service call is performed in response to the request for the network page.

4. The method of claim 1, wherein the configurable function includes function name, at least one function parameter, and a template that specifies a use of the at least one function parameter in a uniform resource locator (URL); and the method further comprises: executing, in the at least one computing device, a service call according to the template using at least one parameter value for the at least one function parameter in the URL in response to determining that the page generation code includes a use of the configurable function with the at least one parameter value.

5. The method of claim 4, wherein executing, in the at least one computing device, the service call according to the template employs at least one proxy function.

6. The method of claim 4, wherein the configurable function is specified separately from the page generation code.

7. The method of claim 1, wherein the call to the configurable function corresponds to a dynamic data variable.

8. The method of claim 1, wherein the at least one service call includes a plurality of service calls, at least some of the service calls being configured to communicate with a plurality of different data sources executed in a plurality of other computing devices.

9. A system, comprising:

at least one computing device; and at least one application executable in the at least one computing device, the at least one application comprising:

logic that obtains a request for a network page from a client, the network page being associated with a network site hosted by a hosting provider on behalf of a customer;

logic that obtains a metadata file supplied by the customer, the metadata file specifying a configurable function that produces at least one data object;

logic that obtains page generation code supplied by the customer, the page generation code corresponding to JavaServer Pages (JSP) code, the page generation code including a call to the configurable function;

logic that executes at least one service call to obtain the at least one data object, wherein the at least one service call is configured to return an extensible markup language (XML) document, and the logic that executes the at least one service call is further configured to instantiate the at least one data object based at least in part on at least one XPath expression;

logic that executes the page generation code to generate the network page in response to the request, wherein the page generation code is executed with the at least one data object in place of the call to the configurable function, wherein the logic that executes is configured to restrict the page generation code from directly executing the at least one service call; and logic that sends the network page to the client in response to the request.

10. The system of claim 9, wherein the configurable function includes a function name, at least one function parameter, and a template that specifies a use of the at least one function parameter in a uniform resource locator (URL).

11. The system of claim 10, wherein the at least one function parameter includes a corresponding data type for each of the at least one function parameter.

12. The system of claim 10, wherein the at least one application further comprises logic that executes a service call according to the template using at least one proxy function.

13. The system of claim 10, wherein the configurable function is specified separately from the page generation code.

14. The system of claim 9, wherein the call to the configurable function corresponds to a dynamic data variable.

15. The system of claim 9, wherein the logic that executes is configured to restrict the page generation code from executing beyond a predetermined number of service calls.

16. The system of claim 9, wherein the page generation code includes Expression Language (EL) code, and the call to the configurable function corresponds to an EL expression.

17. The system of claim 9, wherein the at least one data object corresponds to at least one executable object.

18. The system of claim 9, wherein the call to the configurable function corresponds to an XPath expression.

19. The system of claim 9, wherein the logic that executes is configured to restrict the page generation code from including scriptlet code.

20. The system of claim 9, wherein the at least one service call is configured to communicate with a data source executed in another computing device.

21. The system of claim 9, wherein the at least one service call includes a plurality of service calls, at least some of the service calls being configured to communicate with a plurality of different data sources executed in a plurality of other computing devices.

22. A non-transitory computer-readable medium embodying at least one program executable in a computing device, the program comprising:

code that obtains a request for a network page from a client, the network page being associated with a network site hosted by a hosting provider on behalf of a customer;

code that obtains a metadata file supplied by the customer that specifies a configurable function, the configurable function including a function name, at least one function parameter, and a template that specifies a use of the at least one function parameter in a uniform resource locator (URL);

code that obtains page generation code supplied by the customer, the page generation code corresponding to JavaServer Pages (JSP) code, the page generation code including a call to the configurable function that produces an executable object, the call to the configurable function specifying at least one parameter value;

code that restricts the page generation code from directly executing at least one service call;

code that executes the at least one service call according to the template using the at least one parameter value for the at least one function parameter in the URL, the at least one service call producing an extensible markup language (XML) document;

code that automatically instantiates the executable object from the XML document using XPath code;

code that executes the page generation code to generate the network page, wherein the executable object is accessible by the page generation code; and code that sends the network page to the client in response to the request.

23. The non-transitory computer-readable medium of claim 22, wherein the call to the configurable function corresponds to an Expression Language (EL) expression.

24. The non-transitory computer-readable medium of claim 22, wherein the at least one service call includes a plurality of service calls, at least some of the service calls being configured to communicate with a plurality of different data sources executed in a plurality of other computing devices.

* * * * *